United States Patent
Kasamatsu et al.

(10) Patent No.: US 7,154,710 B2
(45) Date of Patent: Dec. 26, 2006

(54) MAGNETIC HEAD SLIDER

(75) Inventors: Yoshiharu Kasamatsu, Kawasaki (JP); Susumu Yoshida, Kawasaki (JP); Takayuki Musashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 61 days.

(21) Appl. No.: 11/127,081

(22) Filed: May 12, 2005

(65) Prior Publication Data

US 2005/0201012 A1 Sep. 15, 2005

Related U.S. Application Data

(63) Continuation of application No. PCT/JP03/01811, filed on Feb. 19, 2003.

(51) Int. Cl.
*G11B 5/60* (2006.01)

(52) U.S. Cl. .............................. 360/236.6; 360/235.2; 360/235.8

(58) Field of Classification Search ...................... None
See application file for complete search history.

(56) References Cited

U.S. PATENT DOCUMENTS

| | | | |
|---|---|---|---|
| 5,037,470 A | | 8/1991 | Matzen et al. |
| 5,433,766 A | | 7/1995 | Ming et al. |
| 5,654,850 A | * | 8/1997 | Ganapathi et al. ....... 360/235.2 |
| 5,777,825 A | | 7/1998 | Dorius |
| 6,132,485 A | | 10/2000 | Sanders |
| 6,254,656 B1 | | 7/2001 | Noda et al. |
| 6,328,780 B1 | | 12/2001 | Bull et al. |
| 6,349,018 B1 | | 2/2002 | Koishi et al. |
| 6,529,346 B1 | * | 3/2003 | Otsuka ..................... 360/235.8 |
| 2004/0031304 A1 | | 2/2004 | Elizer |

FOREIGN PATENT DOCUMENTS

| | | |
|---|---|---|
| JP | 5-28429 | 2/1993 |
| JP | 7-182628 | 7/1995 |
| JP | 7-230615 | 8/1995 |
| JP | 9-161223 | 6/1997 |
| JP | 10-198938 | 7/1998 |
| JP | 2000-173217 | 6/2000 |

* cited by examiner

*Primary Examiner*—Robert S. Tupper
(74) *Attorney, Agent, or Firm*—Armstrong, Kratz, Quintos, Hanson & Brooks, LLP

(57) ABSTRACT

A magnetic head slider comprises a slider body comprising a base portion made of an altic material and an element-forming portion, made of alumina, having formed thereon magnetic conversion elements. Slider-flying rails protruding beyond the surface of the slider body are provided. A first protection film is formed on the surface of the slider body to cover a boundary between the element-forming portion and the base portion to thereby prevent a lubricant of a magnetic disk from depositing on the boundary between the base portion and the element-forming portion. Second protection films are formed on the surfaces of the slider-flying rails to protect the magnetic conversion elements from being corroded and damaged. Further, when pneumatic bearings are provided on the slider-flying rails, third protection films are formed on the surfaces of the pneumatic bearings.

5 Claims, 5 Drawing Sheets

MAGNETIC HEAD SLIDER

CROSS-REFERENCE TO RELATED APPLICATIONS

This application is a continuation of International Application No. PCT/JP03/01811, filed Feb. 19, 2003, the contents being incorporated herein by reference.

TECHNICAL FIELD

The present invention relates to a magnetic head slider used in a magnetic disk device and, particularly, to a magnetic head slider used for a hard disk in a computer.

BACKGROUND ART

A magnetic disk device comprises a disk and a magnetic head slider supported by a suspension for writing information into the disk and for reading out information from the disk. The magnetic head slider has magnetic converter elements and slider-flying rails, and the air flow acting on the slider-flying rails causes the magnetic head slider to fly above the disk. A modern magnetic head slider comprises a base portion and an element-forming portion which is joined to the base portion and has the magnetic converter elements formed thereon. Typically, the base portion is made of an altic (AlTiC) material and the element-forming portion is made of alumina.

JP-A-5-28429 discloses a magnetic head slider in which the surface of the element-forming portion is set behind the surface of the base portion so that the gap at the end of the magnetic converter element on the surface of the element-forming portion will not easily come into contact with the disk during use of the slider.

JP-A-7-182628 discloses a magnetic head slider in which a base portion is made of a glass or the like, and the base portion and an element-forming portion are covered with a carbon film.

JP-A-7-230615 discloses a magnetic head slider in which a protection film is formed on only an element-forming portion at a step formed between the base portion and the element-forming portion.

JP-A-2000-173217 discloses a negative pressure type magnetic head slider. A slider-flying rail of the negative pressure type magnetic head slider comprises a first rail portion having a transversal component extending in the transverse direction of the slider body and lengthwise components extending in the lengthwise direction of the slider body from both ends of the transversal component, and two second rail portions arranged at the back of the first rail portion maintaining a gap in the transverse direction of the slider body.

In this magnetic head slider, pneumatic bearings are formed on the surfaces of the first and second rail portions. During use of the slider, a force produced on the surfaces of the pneumatic bearings of the slider-flying rails maintains a balance with a negative pressure produced on the back side of the first floating rail portion in a manner to maintain the flying height which is as small as possible relative to the disk of the magnetic head slider.

A protection film such as a carbon film is formed on the surfaces of the first and second rail portions and on the surfaces of the pneumatic bearings protruding therefrom. However, no protection film has been formed on the surfaces where the slider-flying rail of the slider body protrudes.

There is a tendency to decrease the flying height of the magnetic head slider relative to the disk. The magnetic head slider is brought close to the disk accompanying a decrease in the flying height of the magnetic head slider. A lubricant has been applied onto the surface of the disk and if the magnetic head slider is brought close to the disk, the lubricant on the disk can migrate onto the magnetic head slider as a lublicant vapor or in another form.

There will be no problem if the lubricant migrated onto the magnetic head slider from the disk is washed and removed from the magnetic head slider. However, if the lubricant deposits on the magnetic head slider, there arises a problem that the magnetic head slider loses balance to adversely affect the magnetic converter elements. If there is a step formed between the element-forming portion made of alumina and the base portion made of the altic material, the lubricant can easily deposit on the stepped portion. In the production thereof, a surface of the magnetic head slider is flattened by machining such as lapping. However, as the hardness is not the same between the element-forming portion and the base portion, a very small step can be formed between the element-forming portion and the base portion. As a result, when the lubricant adheres near the magnetic converter elements, it can adversely affect the magnetic converter elements, or can cause stiction of the flying slider during the "seeking" operation of the disk, thereby, deteriorating the flying profile of the head and impairing the stability in the characteristics.

DISCLOSURE OF THE INVENTION

It is an object of the present invention to provide a magnetic head slider capable of preventing the lubricant on the magnetic medium from deposition on or near the magnetic converter elements.

The magnetic head slider according to the present invention comprises a slider body comprising a base portion and an element-forming portion joined to the base portion and having magnetic conversion elements formed thereon; a first surface of the slider body that faces a magnetic medium during use of the slider; slider-flying rails protruding beyond the first surface of the slider body and having second surfaces; a first protection film or layer formed on the first surface of the slider body and covering a boundary between the element-forming portion and the base portion; and second protection films or layers formed on the second surfaces of the slider-flying rails to protect the magnetic conversion elements.

In this constitution of the magnetic head slider, the first protection film is formed on a portion inclusive of a boundary between the element-forming portion and the base portion on the first surface of the slider body. The first protection film covers the boundary between the element-forming portion and the base portion, decreases a level of the step even if the step may be produced on the boundary between the element-forming portion and the base portion, and thus prevents the deposition of the lubricant that has migrated onto the magnetic head slider. As a result, it becomes possible to decrease the adverse effect upon the magnetic converter elements due to deposition of the lubricant. The second protection films can protect the magnetic conversion elements.

Preferably, the thickness of the first protection film is different from the thickness of the second protection films. More preferably, the thickness of the first protection film is greater than the thickness of the second protection film. As a result, it becomes possible to prevent the deposition of the lubricant on the magnetic head slider without causing an increase in the thickness of the portions where there are positioned magnetic poles of the magnetic converter elements of the magnetic head slider.

Preferably, the first protection film and the second protection films each comprises a carbon film or carbonaceous layer containing fluorine, the content of fluorine in the first protection film being greater than the content of fluorine in the second protection films. By using fluorine-containing carbon films as the first and second protection films, the deposition of the lubricant can be suppressed. The water-repelling property and oil-repelling property can be improved with an increase in the content of fluorine in the protection films, however, the durability may be lowered. Therefore, the content of fluorine in the first protection film is selected to be greater than the content of fluorine in the second protection films to thereby improve the action of the first protection film for preventing the deposition of lubricant without deteriorating the properties of the second protection films of the slider-flying rails.

According to another aspect of the present invention, the magnetic head slider comprises a slider body comprising a base portion and an element-forming portion joined to the base portion and having magnetic conversion elements formed thereon; a first surface of the slider body that faces a magnetic medium during use of the slider; slider-flying rails protruding beyond the first surface of the slider body and having second surfaces; pneumatic bearing portions protruding beyond the second surfaces of the slider-flying rails and having third surfaces; a first protection film formed on the first surface of the slider body and covering a boundary between the element-forming portion and the base portion; second protection films formed on the second surfaces of the slider-flying rails; and third protection films formed on the third surfaces of the pneumatic bearings to protect the magnetic conversion elements.

In this constitution of the magnetic head slider, as in the above-described constitution, the first protection film is formed on a portion inclusive of a boundary between the element-forming portion and the base portion on the first surface of the slider body. The first protection film covers the boundary between the element-forming portion and the base portion, decreases a level of the step even if the step may be produced on the boundary between the element-forming portion and the base portion, and thus prevents the deposition of the lubricant that has migrated onto the magnetic head slider. As a result, it becomes possible to decrease the adverse effect upon the magnetic converter elements due to deposition of the lubricant. The second and third protection films can protect the magnetic conversion elements.

Preferably, the slider-flying rails comprise a first rail portion having a transversal component extending in the transverse direction of the slider body and lengthwise components extending in the lengthwise direction of the slider body from both ends of the transversal component, and two second rail portions arranged at the back of the first rail portion maintaining a distance in the transverse direction of the slider body. The slider-flying rails are effective to provide a negative pressure-type magnetic head.

BEST MODE FOR CARRYING OUT THE INVENTION

Figure 1:
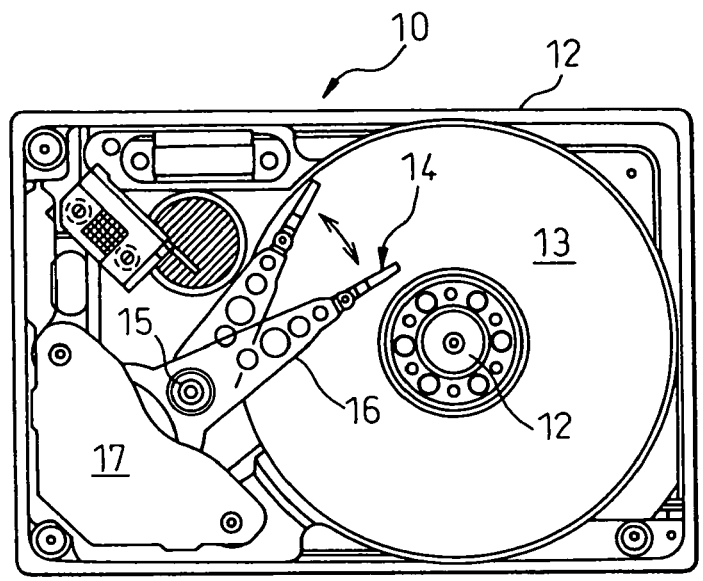
FIG. 1 is a plan view illustrating a disk device according to an embodiment of the present invention.

FIG. 1 is a plan view illustrating a disk device according to one embodiment of the present invention. In FIG. 1, a disk device (HDD) 10 has a housing 11 which has disposed therein a magnetic disk 13 mounted on a spindle motor 12, and a magnetic head slider 14 facing the magnetic disk 13. The magnetic head slider 14 is secured to an end of a carriage arm 16 that can swing about a shaft 15. The carriage arm 16 is driven by an actuator 17 to swing. The magnetic head slider 14 is positioned on a desired recording track of the magnetic disk 13. As a result, the magnetic head slider 14 can write information into the magnetic disk 13 and read out information from the magnetic disk 13.

Figure 2:
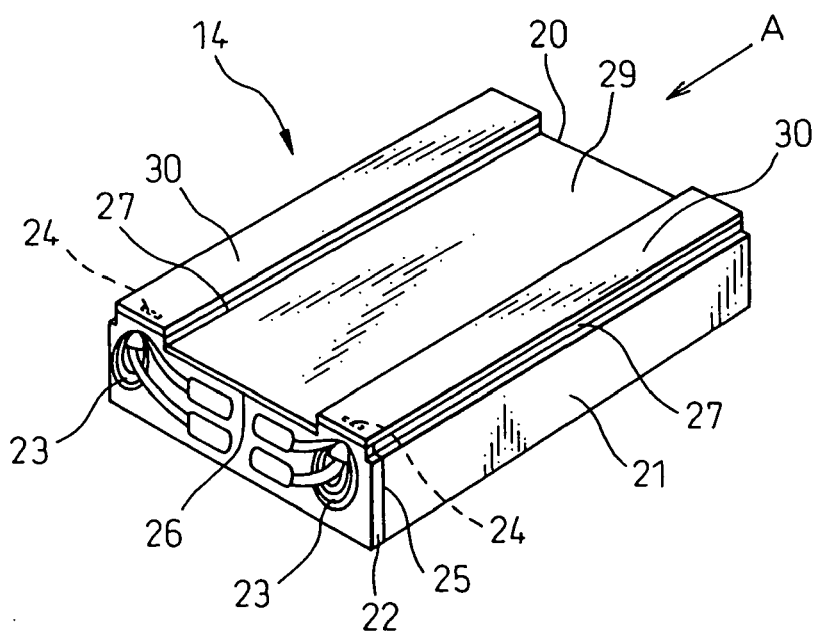
FIG. 2 is a perspective view illustrating a magnetic head slider according to an embodiment of the present invention.
Figure 3:
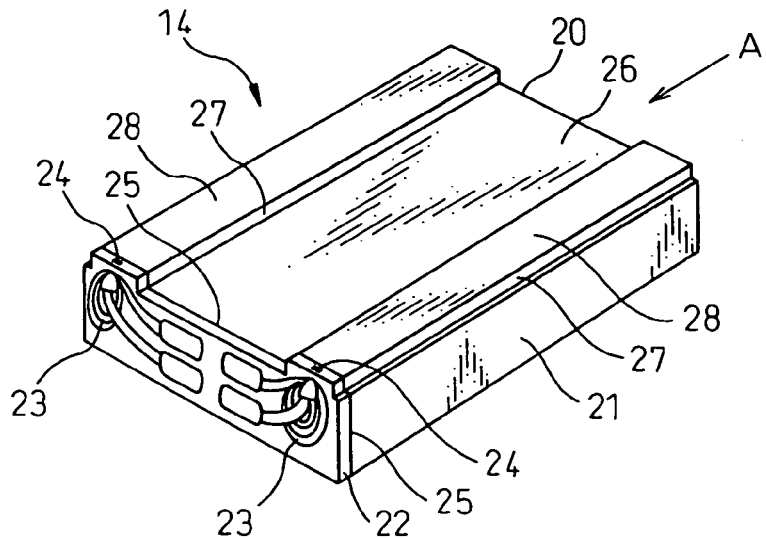
FIG. 3 is a perspective view illustrating the magnetic head slider of FIG. 2 from which the protection films were omitted.

FIG. 2 is a perspective view illustrating the magnetic head slider 14 according to one embodiment of the invention. FIG. 3 is a perspective view illustrating the magnetic head slider of FIG. 2 from which the protection films were omitted. In FIGS. 2 and 3, the magnetic head slider 14 comprises a slider body 20. The slider body 20 comprises a base portion 21 and an element-forming portion 22 joined to the base portion 20. The element-forming portion 22 has magnetic converter elements 23 fabricated through a thin film formation process, and the magnetic converter elements 23 has a magnetic pole 24. The base portion 21 is made of an altic material ($Al_2O_3TiC$) and the element-forming portion 22 is made of alumina ($Al_2O_3$). Reference numeral 25 denotes a boundary between the element-forming portion 22 and the base portion 21. An arrow A in FIG. 2 represents a direction in which the air flows relative to the magnetic head slider 14 when the disk device 10 is operated.

The magnetic head slider 14 has a surface (first surface) 26 that faces the magnetic disk 13 during operation of the slider 14. The first surface 26 of the magnetic head slider 14 includes the boundary 25 between the element-forming portion 22 and the base portion 21. A pair of parallel slider-flying rails 27 are provided protruding beyond the first surface 26 of the slider body. The slider-flying rails 27 have second surfaces 28. The magnetic poles 24 appear on the second surfaces 28 of the slider-flying rails 27.

A first protection film 29 is formed on the first surface 26 of the slider body 20 in such a manner that the boundary 25 between the element-forming portion 22 and the base portion 21 is covered with the protection film 29. Second protection films 30 are formed on the second surfaces 28 of the slider-flying rails 27 to protect the magnetic poles 24 of the magnetic converter elements 23. The second protection films 30 are also intended to prevent the magnetic poles 24 of the magnetic converter elements 23 from being corroded and damaged. In FIG. 3, the first surface 26 and the second surfaces 28 can be seen since the first protection film 29 and the second protection films 30 have been omitted from the drawing. Referring to FIG. 2, the first protection film 29 and the second protection films 30 have been formed on the first surface 26 and on the second surfaces 28, respectively.

Figure 4:
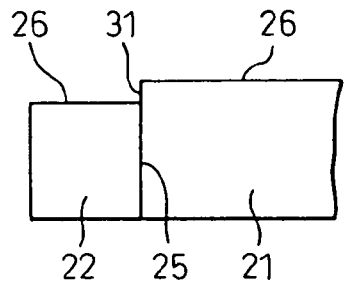
FIG. 4 is a sectional view schematically illustrating a portion inclusive of a boundary between an element-forming portion and a base portion of the magnetic head slider of FIG. 3.

FIG. 4 is a sectional view schematically illustrating a portion inclusive of the boundary 25 between the element-forming portion 22 and the base portion 21 of the magnetic head slider 14 of FIG. 3. At the time of producing the magnetic head slider 14, the first surface 26 is flattened by machining such as lapping. However, as the element-forming portion 22 is made of alumina, the base portion 21 is made of the altic material, and the hardness is different between the alumina and the altic material, a very small step 31 can be formed in the boundary 25 between the element-forming portion 22 and the base portion 21 on the first surface 26. That is, a portion of the first surface 26 of the element-forming portion 22 becomes lower than a portion of the first surface 26 of the base portion 21. In the presence of the difference 31, when a lubricant is applied onto the surface of the magnetic disk 13, the lubricant can migrate onto the magnetic head slider 14 and thus can easily deposit on the bottom of the step 31 as a result of its flowing along the first surface 26.

Figure 5:
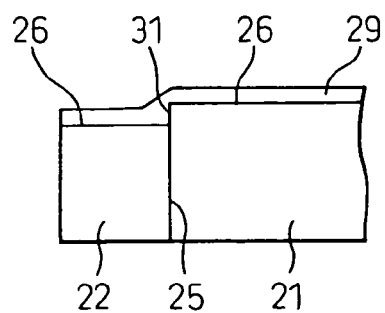
FIG. 5 is a sectional view schematically illustrating the portion inclusive of the boundary between the element-forming portion and the base portion of the magnetic head slider of FIG. 2.

FIG. 5 is a sectional view schematically illustrating a portion inclusive of the boundary 25 between the element-forming portion 22 and the base portion 21 of the magnetic head slider 14 of FIG. 2. The first protection film 29 is formed on the first surface 26 of the slider body 20 covering the boundary 25 between the element-forming portion 22 and the base portion 21, i.e., the protection film 29 is formed spanning across the element-forming portion 22 and the base portion 21. As the first protection film 29 is covering the boundary 25 between the element-forming portion 22 and the base portion 21, the surface of the first protection film 29 at the step 31 shows a gentle slope in comparison with that of when the step 31 is exposed. Therefore, the lubricant migrated onto the magnetic head slider 14 from the magnetic disk 13 can easily flow along the first surface 26 of the slider body 20 to thereby prevent the lubricant from depositing. As a result, the adverse effect upon the magnetic converter elements 23 caused by the deposition of the lubricant can be inhibited. The flying operation of the magnetic head slider 14 is not hindered by the deposited lubricant.

It is preferred that the first protection film 29 and the second protection films 30 are formed from carbon films (e.g., DLC). The thickness of the first protection film 29 is preferably different from the thickness of the second protection films 30. Moreover, it is preferred that the thickness of the first protection film 29 is greater than the thickness of the second protection films 30. As a result, it becomes possible to give a smooth slope to the first protection film 29 on the step 31 by increasing the thickness of the first protection film 29 and to prevent the deposition of the lubricant on the first surface 26 of the magnetic head slider 14 without increasing the thickness of the magnetic head slider 14 (the thickness of the portions where the magnetic poles 24 of the magnetic converter elements 23 are positioned) and, hence, realizing a small magnetic head slider 14. For instance, the thickness of the first protection film 29 is 10 nm and the thickness of the second protection film 30 is 3 to 5 nm.

In addition, it is preferred that the first protection film 29 and the second protection films 30 are formed from carbon films containing fluorine. In the fluorine-containing carbon films, it is preferred that the fluorine content in the first protection film 29 is greater than the fluorine content in the second protection film 30.

Figure 6:
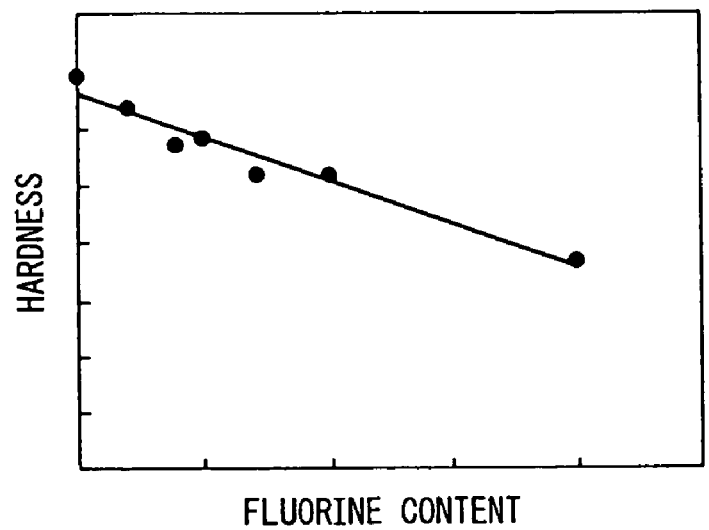
FIG. 6 is a graph illustrating a relationship between the content of fluorine in the protection film and the hardness of the protection film.

FIG. 6 is a graph illustrating a relationship between the fluorine content in DLC constituting the protection film and the hardness of the protection film. The hardness of the protection film decreases with an increase in the fluorine content. Therefore, it is desired that the content of fluorine is lowered to improve the mechanical strength of the protection film.

Figure 7:
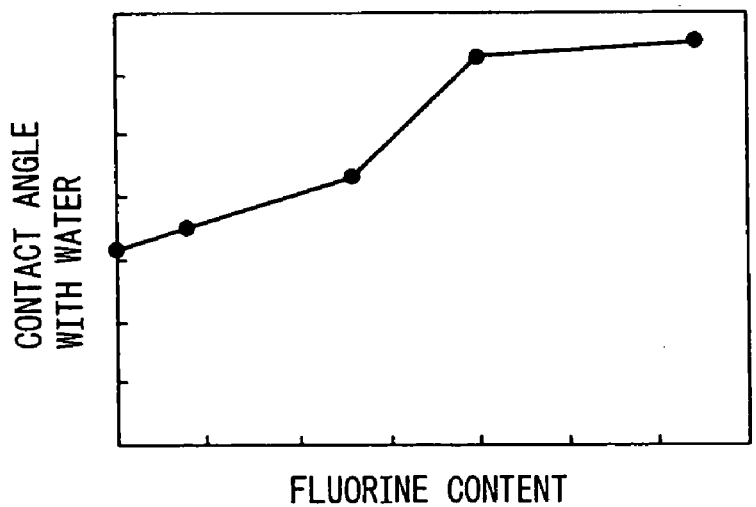
FIG. 7 is a graph illustrating a relationship between the content of fluorine in the protection film and the contact angle of the protection film with water.

FIG. 7 is a graph illustrating a relationship between the fluorine content in DLC constituting the protection film and the contact angle of the protection film with water. The contact angle of the protection film with water increases with an increase in the fluorine content. As the lubricant is a foreign matter, its adhesion on the protection film can be inhibited with increase of the contact angle of the protection film with water.

As described above, use of carbon films containing fluorine as the first protection film 29 and as the second protection films 30 suppresses the adhesion of the lubricant on the first protection film 29 and on the second protection films 30. An increase in the fluorine content in the protection films can result in an improvement in the water-repelling property and oil-repelling property, however, the durability may be lowered. Therefore, it is suggested to increase the fluorine content in the first protection film 29 than in the second protection films 30 to thereby increase the action for preventing the deposition of the lubricant on the first surface 26 without decreasing the mechanical strength of the slider-flying rails 27.

Figure 8:
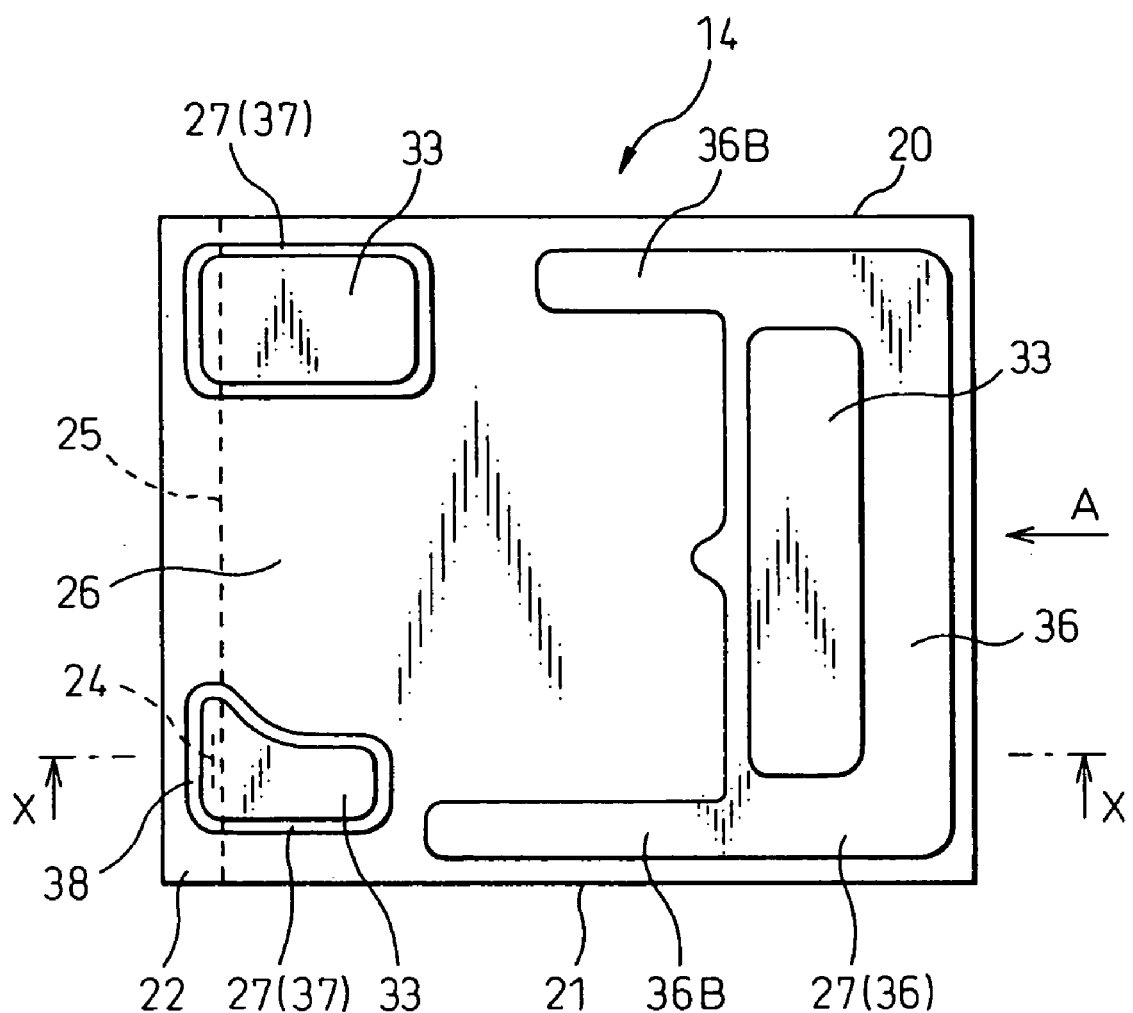
FIG. 8 is a plan view illustrating the magnetic head slider according to another embodiment of the present invention.
Figure 9:
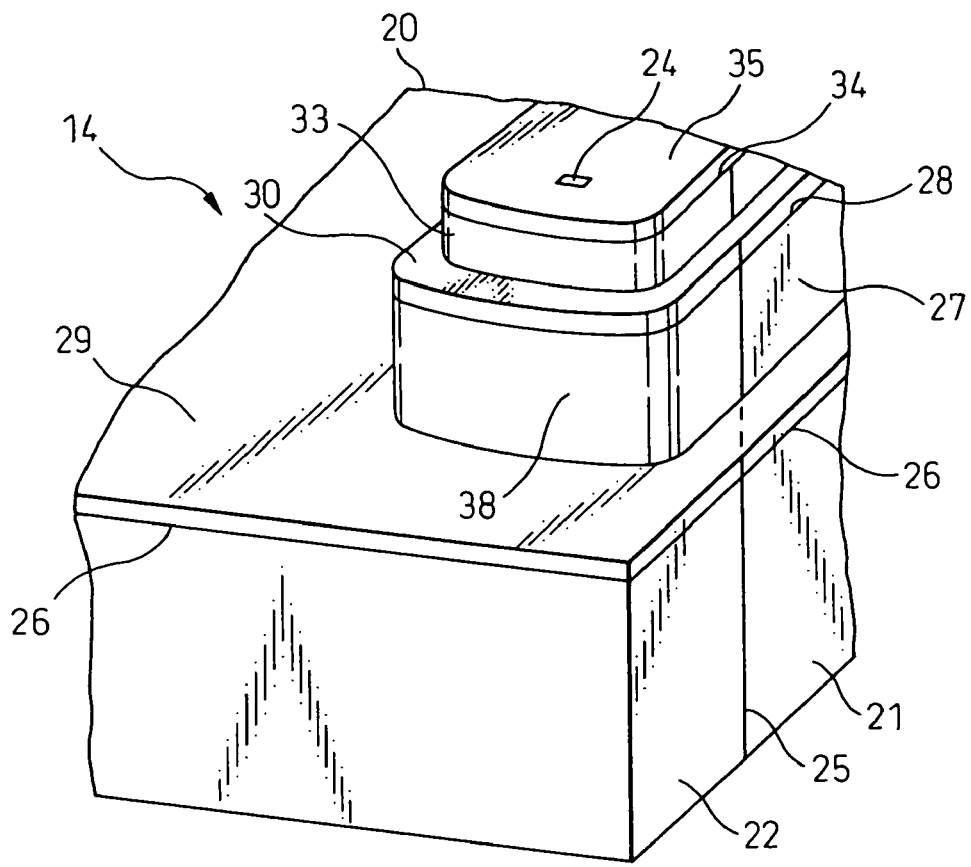
FIG. 9 is a perspective view illustrating, on an enlarged scale, a portion of the magnetic head slider of FIG. 8.
Figure 10:
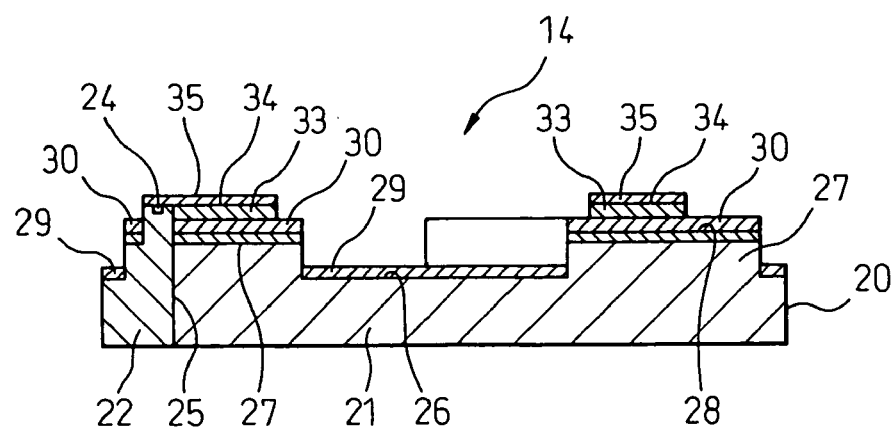
FIG. 10 is a sectional view taken along the line X—X of the magnetic head slider of FIG. 8.

FIG. 8 is a plan view illustrating the magnetic head slider according to another embodiment of the present invention. FIG. 9 is a perspective view illustrating, on an enlarged scale, a portion of the magnetic head slider of FIG. 8. FIG. 10 is a sectional view taken along the line X—X of the magnetic head slider of FIG. 8. Note that the magnetic head slider shown in FIGS. 8 to 10 is a head slider of the negative pressure type.

The magnetic head slider 14 comprises the slider body 20 which comprises the base portion 21 and the element-forming portion 22 joined to the base portion 21. The base portion 21 is made of an altic material ($Al_2O_3$TiC) and the element-forming portion 22 is made of alumina ($Al_2O_3$). Magnetic converter elements 23 (see FIGS. 2 and 3) are fabricated on the element-forming portion 22 through the thin film formation process. The magnetic converter elements 23 have magnetic poles 24. The arrow A represents an air flow direction relative to the magnetic head slider 14 during operation of the disk device 10.

The magnetic head slider 14 has a surface (first surface) 26 that faces the magnetic disk 13 during operation. The first surface 26 of the magnetic head slider 14 includes a boundary 25 between the element-forming portion 22 and the base portion 21. The slider-flying rails 27 are protruding beyond the first surface 26 of the slider body. The rails 27 have second surfaces 28. As will be described later, the shape of the rails 27 is different from the shape of the rails 27 described referring to FIGS. 2 and 3. Further, pneumatic bearings 33 are provided protruding beyond the second surfaces 28 of the rails 27. The pneumatic bearings 33 have third surfaces 34. The magnetic poles 24 appear on the third surfaces 34 of the pneumatic bearings 33.

A first protection film 29 is formed on the first surface 26 of the slider body 20 covering the boundary 25 between the element-forming portion 22 and the base portion 21. Second protection films 30 are formed on the second surfaces 28 of the slider-flying rails 27. Third protection films 35 are formed on the third surfaces 34 of the pneumatic bearings 33 to protect the magnetic poles 24 of the magnetic conversion elements 23. Note that, in FIG. 8, the first protection film 29, second protection films 30 and the third protection films 35 are not illustrated.

The action of the first protection film 29 is the same as the action of the first protection film 29 of the above embodiment, and the action of the second protection films 30 and of the third protection films 35 is the same as the action of the second protection films 30 of the above embodiment. Further, it is preferred that the first protection film 29, second protection films 30 and third protection films 35 are formed from carbon films (e.g., DLC). It is preferred that the thickness of the first protection film 29 is different from the thicknesses of the second protection films 30 and of the third protection films 35. In this case, it is preferred that the thickness of the first protection film 29 is greater than the thickness of the second protection films 30 and the thickness of the third protection films 35. As the result, it becomes possible to form the first protection film 29 having a smoother surface on the very small step 31 (see FIGS. 4 and 5) produced on the boundary 25 between the element-forming portion 22 and the base portion 21 of the first surface 26 to thereby prevent the deposition of the lubricant on the first surface 26 of the magnetic head slider 14 without increasing the thickness of the magnetic head slider 14 and, hence, realizing the miniatured magnetic head slider 14.

Similarly, it is preferred that the first protection film 29, the second protection films 30 and the third protection films 35 are formed from carbon films containing fluorine. In this case, it is preferred that the fluorine content in the first protection film 29 is greater than the fluorine content in the second protection films 30 and in the third protection films 35.

Next, the slider-flying rails 27 and the pneumatic bearings 33 will be described in detail. The slider-flying rails 27 comprise a first rail portion 36 positioned on the upstream side as viewed in the air flows direction A, and two second floating rail portions 37 arranged at the back of the first rail portion 36 maintaining a distance in the transverse direction of the slider body 20. The pneumatic bearings 33 are provided on the first rail portion 36 and on the second rail portions 37.

The first rail portion 36 comprises a transversal component 36A extending in the transverse direction of the slider body 20, and lengthwise components 36B extending in the lengthwise direction of the slider body 20 from both ends of the transversal component 36A. A space surrounded by the transversal component 36A and by the lengthwise components 36B have an increased volume. A gap extended in the lengthwise direction is produced between the lengthwise components 36B and the second rail portions 37.

During operation of the illustrated magnetic head slider, the air can partially pass over the transversal component 36A of the first rail portion 36, flow into the space on the back side and then flow toward the downstream side. Another part of the air can flow along the second rail portions 37 detouring the transversal component 36A and the lengthwise components 36B of the first rail portion 36. A further part of the air can flow into the space between the pair of second rail portions 37 passing through gaps between the lengthwise components 36B and the second rail portions 37, and flows toward the downstream side.

The pneumatic bearings 33 is subjected to a flying force as a result of generation of the air flow. The flying force can act in a direction in which the magnetic head slider 14 separates away from the magnetic disk 13. On the other hand, the air passing over the transversal component 36A of the first rail portion 36 and flowing into the space at the back side thereof can produces a negative pressure due to an increased volume of the space. The negative pressure can act in a direction in which the magnetic head slider 14 is pulled toward the magnetic disk 13. Thus, by maintaining a suitable balance between the buoyancy and the negative pressure, the magnetic head slider 14 can stably fly over the magnetic disk 13 while maintaining a small distance between the slider 14 and the disk 13.

In the production of the magnetic head slider 14, after the magnetic converter elements 23 are formed, the second surfaces 28 constitute the surfaces of the magnetic head slider 14 (block constituting the magnetic head slider 14). Next, first carbon layers (DLC layers) that serve as second protection films 30 are formed on the surfaces (second surfaces 28) of the magnetic head slider 14 via the first adhesion layer. Further, second carbon layers (DLC layers) that serve as third protection films 35 are formed on the surfaces of the first carbon layers (DLC layers) via the second adhesion layer. The second adhesion layer and the second carbon layers (DLC layers) are etched in the presence of a mask to form the pneumatic bearings 33 and the third protection films 35. The remaining portions of the second adhesion layer can act as the pneumatic bearings 33. The first adhesion layer and the second carbon layers (DLC layers) are then etched in the presence of a mask to form the slider-flying rails 27 and the second protection films 30. Etching is carried out to expose the altic layer constituting the base portion 21 and the alumina layer constituting the element-forming portion 22 upon grinding. As a result, the bottom surface of the ground layer becomes lower than the second surfaces 28 to form the first surface 26 of the magnetic head slider 14. Accordingly, the slider-flying rails 27 protrude beyond the first surface 26. Thereafter, the first protection film 29 is formed on the first surface 26 of the magnetic head slider 14. This feature is illustrated in FIG. 10. Therefore, if becomes possible to vary the thicknesses and compositions of the first protection film 29, second protection films 30 and third protection films 35.

Referring to FIG. 9, the ends of the slider-flying rails 27 where the magnetic converter elements 23 are positioned (ends of the second rail portions 37 on the downstream side) are also ground and removed by etching. By cutting the edges as illustrated, the magnetic poles 24 of the magnetic converter elements 23 can be brought closer to the magnetic disk 13. The first protection film 29 is formed up to the rear side of the ends 38 of the rails 27 where the magnetic converter elements 23 are positioned on the first surface 26. Therefore, the lubricant can be prevented from depositing near the positions where the magnetic converter elements 23 are formed.

The invention claimed is:

1. A magnetic head slider comprising:
a slider body comprising a base portion and an element-forming portion joined to said base portion and having formed thereon magnetic conversion elements;
a first surface of said slider body that faces a magnetic medium during use of said slider;

slider-flying rails protruding beyond the first surface of said slider body and having second surfaces;

pneumatic bearing portions protruding beyond the second surfaces of said slider-flying rails and having third surfaces;

a first protection film formed on the first surface of the slider body and covering a boundary between said element-forming portion and said base portion;

second protection films formed on the second surfaces of said slider-flying rails; and third protection films formed on the third surfaces of said pneumatic bearings to protect said magnetic conversion elements.

2. A magnetic head slider according to claim 1, wherein said slider-flying rails comprise a first rail portion, having a transversal component extending in the transverse direction of said slider body and lengthwise components extending in the lengthwise direction of said slider body from both ends of said transversal component, and two second rail portions arranged at the back of said first rail portion with a distance in the transverse direction of said slider body.

3. A magnetic head slider according to claim 2, wherein the thickness of said first protection film is different from the thickness of each of said second and third protection films.

4. A magnetic head slider according to claim 3, wherein the thickness of said first protection film is greater than the thickness of each of said second and third protection films.

5. A magnetic head slider according to claim 2, wherein said first protection film, said second protection films and said third protection films each comprises a carbon film containing fluorine, the content of fluorine in said first protection film being greater than the content of fluorine in said second and third protection films.

* * * * *